United States Patent
Bilic et al.

(10) Patent No.: US 7,050,437 B2
(45) Date of Patent: May 23, 2006

(54) WIRE SPEED REASSEMBLY OF DATA FRAMES

(75) Inventors: Hrvoje Bilic, Haifa (IL); Giora Biran, Zichron Ya'akov (IL); Igor Chirashnya, Haifa (IL); Georgy Machulsky, Naharia (IL); Claudiu Schiller, Haifa (IL); Tal Sostheim, Kiryat Tivon (IL)

(73) Assignee: International Business Machines Corporation, Armonk, NY (US)

( * ) Notice: Subject to any disclaimer, the term of this patent is extended or adjusted under 35 U.S.C. 154(b) by 956 days.

(21) Appl. No.: 09/810,940

(22) Filed: Mar. 16, 2001

(65) Prior Publication Data

US 2001/0048681 A1    Dec. 6, 2001

Related U.S. Application Data

(60) Provisional application No. 60/192,085, filed on Mar. 24, 2000.

(51) Int. Cl.
H04L 12/56        (2006.01)

(52) U.S. Cl. .................... 370/394; 370/395.7
(58) Field of Classification Search ................ 390/394, 390/395.52, 395.7, 395.72, 473, 474, 235, 390/236

See application file for complete search history.

(56) References Cited

U.S. PATENT DOCUMENTS

| | | | |
|---|---|---|---|
| 5,590,122 A * | 12/1996 | Sandorfi et al. | 370/394 |
| 5,699,361 A * | 12/1997 | Ding et al. | 370/431 |
| 5,706,425 A * | 1/1998 | Unekawa | 714/55 |
| 5,815,501 A * | 9/1998 | Gaddis et al. | 370/402 |
| 5,917,824 A | 6/1999 | Brueckheimer et al. | |
| 6,032,190 A | 2/2000 | Bremer et al. | |
| 6,041,043 A | 3/2000 | Denton et al. | |
| 6,078,733 A | 6/2000 | Osborne | |
| 6,137,796 A * | 10/2000 | Derango et al. | 370/389 |
| 6,314,477 B1 * | 11/2001 | Cowger et al. | 710/22 |
| 6,343,072 B1 | 1/2002 | Bechtolsheim et al. | |
| 6,359,887 B1 * | 3/2002 | Brockhage et al. | 370/394 |
| 6,470,015 B1 * | 10/2002 | Koga et al. | 370/395.1 |
| 6,493,347 B1 * | 12/2002 | Sindhu et al. | 370/401 |
| 6,502,135 B1 * | 12/2002 | Munger et al. | 709/225 |
| 6,680,938 B1 * | 1/2004 | Hammermeister et al. | 370/360 |
| 6,810,431 B1 | 10/2004 | Narisi et al. | |
| 6,822,960 B1 * | 11/2004 | Manchester et al. | 370/394 |

OTHER PUBLICATIONS

Postel, RFC 791 of the U.S. Defense Advanced Research Projects Agency (DARPA), entitled "Internet Protocol: DARPA Internet Program Protocol Specification", 1981, 45 pages.

Postel, RFC 793, entitled "Transmission Control Protocol: DARPA Internet Program Protocol Specification", 1981, 84 pages.

Postel, RFC 768 of the University of Southern California, Information Sciences Institute, entitled "User Datagram Protocol", 1980, 5 pages.

* cited by examiner

Primary Examiner—Kwang Bin Yao
(74) Attorney, Agent, or Firm—Darby & Darby

(57) ABSTRACT

A network interface device includes receive logic, which is coupled to receive from a network a sequence of data packets, each packet including respective header data. A protocol processor is coupled to read and process the header data so as to identify a group of the received packets that contain respective fragments of a data frame, the fragments having a fragment order within the data frame. Host interface logic is coupled to a host memory accessible by a host processor, and is controlled by the protocol processor so as to allocate space for the data frame in the host memory, and to reassemble the fragments of the data frame in the fragment order in the space allocated in the host memory.

46 Claims, 4 Drawing Sheets

WIRE SPEED REASSEMBLY OF DATA FRAMES

CROSS-REFERENCE TO RELATED APPLICATION

This application claims the benefit of U.S. Provisional Patent Application No. 60/192,085, filed Mar. 24, 2000. This application is related to another U.S. patent application, entitled "Network Adapter with Embedded Deep Packet Processing," filed on even date. Both of these related applications are assigned to the assignee of the present patent application and are incorporated herein by reference.

FIELD OF THE INVENTION

The present invention relates generally to data communications over packet networks, and specifically to methods and devices for high-speed packet data processing.

BACKGROUND OF THE INVENTION

In recent years, the speed of networking hardware has increased by two or three orders of magnitude, enabling packet networks such as Gigabit Ethernet and InfiniBand™ to operate at speeds in excess of 1 Gb/s. Network interface adapters for these high-speed networks typically provide dedicated hardware for physical layer and data link layer processing (Layers 1 and 2 in the Open Systems Framework model). This hardware is capable of operating at wire speed, i.e., transmitting and receiving packets at the full, specified speed at which the network itself is able to carry data.

Higher-level protocols, however, are still processed for the most part by software running on host CPUs (central processing units) connected to the network. These higher-level protocols include network layer (Layer 3) protocols, such as the Internet Protocol (IP), and transport layer (Layer 4) protocols, such as the Transport Control Protocol (TCP) and User Datagram Protocol (UDP), as well as application layer protocols (Layer 5) and above. IP is described by Postel in RFC 791 of the U.S. Defense Advanced Research Projects Agency (DARPA), entitled "Internet Protocol: DARPA Internet Program Protocol Specification" (1981). TCP is described by Postel in DARPA RFC 793, entitled "Transmission Control Protocol: DARPA Internet Program Protocol Specification" (1981). UDP is described by Postel in RFC 768 of the University of Southern California, Information Sciences Institute, entitled "User Datagram Protocol" (1980). These documents are incorporated herein by reference.

Typically, a long TCP or UDP segment is divided into several IP packets for transmission over the network. In the context of the present patent application and in the claims, the term "frame" is used to refer generally to transport-layer datagrams, such as TCP and UDP segments, as well as to other upper-layer datagrams that are divided among multiple packets at the network layer. Each of the packets into which the frame is divided is said to contain a fragment of the original frame. IP can handle frames of up to 64 KB in this manner. All packets containing fragments of a given frame contain a unique identification (ID) field in their IP headers to indicate the frame to which they belong. A fragment offset field identifies the position of each fragment in the original frame. The fragment offset and the data length of the fragment determine the portion of the original frame covered by any given fragment. A more-fragments (MF) flag is set in the IP header of each packet containing a fragment except for that containing the last fragment in the frame. These fields provide sufficient information to reassemble the frames at the receiver.

The packets containing the fragments of a given frame arrive separately at the receiving end of an IP network connection, not necessarily in the order in which they were sent. In systems known in the art, the network adapter at the receiving end transfers the packets to the memory of the receiving host. The host then processes the IP and TCP or UDP protocol headers of the packets in order to reassemble the fragments of the data frame in the original order. It uses the frame ID field to sort fragments into the frames to which they belong. It then reassembles the frames by placing the data portion of each fragment in the relative position indicated by the fragment offset in that fragment's IP header. The first fragment has its fragment offset equal to zero. The last fragment is recognized by virtue of having its MF flag reset to zero.

These header processing and reassembly tasks can consume considerable host resources. As a result, even when the network adapter is capable of wire speed operation, the processing burden on the host limits the effective speed of network data transfers to much lower rates.

One way to reduce the burden of frame reassembly imposed on the host processor is to use proprietary data link layer (Layer 2) structures to deal with large data frames. For example, the Jumbo Frames protocol, developed by Alteon Web Systems (San Jose, Calif.), defines frames and fragmentation at the data link level. Using this protocol, IP frames are not fragmented at all, and instead are transferred as a single link-layer unit.

Frame reassembly based on proprietary link-layer structures is commonly supported by dedicated network adapter hardware, including link-layer logic and reassembly buffers. Implementing these buffers requires a substantial amount of memory to be added to the adapter, which increases the overall adapter cost. Various design assumptions can be made in order to decrease the amount of memory required, for example, assuming that all of the fragments of a given frame will arrive within a certain time limit. Such assumptions may be reasonable in proprietary networks, in which packet latency and jitter are well-controlled, but they are not applicable to general-purpose IP networks.

SUMMARY OF THE INVENTION

In preferred embodiments of the present invention, a network interface adapter receives fragments of data frames over a network and reassembles the data frames in their proper order directly in host memory. The adapter notifies the host processor only after the entire frame has been received, processed and written to the host memory in the proper order. The host processor can then access the frame payload data immediately, and is freed of the burden of protocol processing and frame reassembly.

Preferably, the adapter comprises an embedded processor, which processes protocol headers of incoming packets to identify fragments of different data frames. When the embedded processor detects that a packet contains a fragment of a new frame (regardless of the order of the fragments in the frame and of the position of the fragment in the order), it allocates space for the frame in the host memory. As each fragment of the frame arrives at the adapter, the processor adds it to the host memory, using the information in the packet headers to place the fragment in the appropriate position in the allocated space until the entire frame has been reassembled.

The present invention thus provides a generic solution to the problem of data frame reassembly, enabling the network adapter to serve frames to the host processor at wire speed. Unlike solutions known in the art, preferred embodiments of the present invention do not require the addition of large quantities of buffer memory to the network adapter, nor are they restricted to specific, proprietary networks or protocols. Rather, the embedded processor that is responsible for frame reassembly can be programmed in firmware to handle a wide variety of fragmentation and reassembly protocols, as are known in the art.

In some preferred embodiments of the present invention, the embedded processor is programmed to process TCP/IP and UDP/IP headers, and thus to reassemble TCP and UDP frames (or segments) in the host memory. Packets transferred using other protocols are passed through to the host processor without header processing or reassembly. Based on frame information contained in the IP, TCP and UDP headers, the embedded processor detects new frames and determines the amount of space to allocate for each frame in the host memory. Preferably, the embedded processor maintains a table of frames that are in the process of reassembly, for use in sorting and assigning the incoming fragments. It arranges the fragments in the memory using the offset and length parameters provided in the IP headers. The IP headers themselves are preferably removed from the frame after they have been processed. In their stead, the embedded processor generates a single frame header, which is written to the host memory along with the frame data.

Preferably, if the embedded processor determines that a given frame has not been reassembled completely within a predetermined time limit, it concludes that one or more fragments of the frame have been lost. The embedded processor then frees the space allocated for the frame in the host memory and, as required by protocols such as TCP, sends an appropriate notification over the network to the source of the frame. Optionally, the embedded processor is programmed to filter incoming fragments by source address, and to reassemble data frames only when they are received from a predetermined list or range of source addresses, which are expected to have reliable, low-latency connections with the receiving adapter. This discriminatory reassembly policy is useful in reducing the amount of host memory that the network adapter will need to allocate for reassembly and avoids wasting memory resources on frames that are likely to time out and be discarded.

There is therefore provided, in accordance with a preferred embodiment of the present invention, a network interface device, including:

receive logic, which is coupled to receive from a network a sequence of data packets, each packet including respective header data;

a protocol processor, coupled to read and process the header data so as to identify a group of the received packets that contain respective fragments of a data frame, the fragments having a fragment order within the data frame; and host interface logic, which is coupled to a host memory accessible by a host processor, and is controlled by the protocol processor so as to allocate space for the data frame in the host memory, and to reassemble the fragments of the data frame in the fragment order in the space allocated in the host memory.

Preferably, the protocol processor is arranged to identify the group of the packets and to control the host interface logic so as to reassemble the fragments irrespective of whether the sequence in which the packets are received coincides with the fragment order. Most preferably, the protocol processor is arranged to control the host interface logic so as to allocate the space for the data frame responsive to the header data of the packet received first in the sequence among the packets in the group, regardless of whether the packet received first in the sequence is first in the fragment order. Additionally or alternatively, the protocol processor is arranged to control the host interface logic so as to write each of the fragments to a respective location within the allocated space in the host memory responsive to a fragment offset parameter in the header data of each of the packets.

Further additionally or alternatively, the protocol processor is arranged to determine a size of the space to allocate responsive to a frame length indication in the header data of the packet received first in-the sequence. Preferably, the frame length indication includes one or more fields in the header data indicating an exact length of the data frame. Alternatively, the frame length indication includes one or more fields in the header data indicating an upper bound on a length of the data frame.

Preferably, the protocol processor is arranged to monitor a time required to receive all of the packets in the group, and to control the host interface logic so as to release the space allocated for the data frame if the time exceeds a predetermined limit without all of the fragments in the data frame having been reassembled. Most preferably, when the time exceeds the predetermined limit without all of the fragments in the data frame having been reassembled, the protocol processor is arranged to return a message over the network to a source of the packets indicating that the data frame was not received.

Typically, the group of the received packets is one of a plurality of different groups, the packets in the different groups containing the fragments of different, respective data frames, and the protocol processor is arranged to identify the different groups and to control the host interface logic so as to simultaneously reassemble the fragments of the different data frames in respectively-allocated spaces in the host memory.

Preferably, the packets are transmitted over the network and received by the receive logic in accordance with one or more communication protocols, whereby the header data in the packets include protocol information, and the protocol processor is arranged to identify the group and to control the host interface logic responsive to the protocol information. Further preferably, the one or more communication protocols include a plurality of different communication protocols, and the protocol processor is arranged to select the group of packets for reassembly depending on which of the communication protocols was used in transmitting the packets.

Preferably, the one or more protocols include a network layer protocol, most preferably an Internet Protocol (IP). Additionally or alternatively, the one or more protocols include a transport layer protocol, preferably a Transport Control Protocol (TCP) or a User Datagram Protocol (UDP).

In a preferred embodiment, the receive logic is coupled to receive the packets over the network from a plurality of different sources, and the protocol processor is arranged to select the group of packets for reassembly dependent on the packets having been received from one or more chosen sources among the plurality of different sources. Preferably, the selected sources are chosen responsive to a level of reliability of a connection over the network between the chosen sources and the network interface device.

Preferably, the protocol processor is arranged to control the host interface logic so as to write the data packets that do not belong to the identified group to the host memory substantially without reassembly processing thereof by the network interface device.

In a preferred embodiment, the host interface logic includes a direct memory access (DMA) engine, which is arranged to write the fragments to the host memory substantially without involvement of the host processor. Preferably, the host interface logic is coupled to notify the host processor that the fragments of the data frame have been reassembled in the host memory only after all of the fragments have been reassembled. Further preferably, the protocol processor is arranged to determine a total length of the data frame responsive to the header data of at least one of the packets in the group, and to count a quantity of the data in the fragments reassembled in the data frame, and to determine that all of the fragments have been reassembled by comparing the total length to the quantity of the data reassembled. Additionally or alternatively, the protocol processor is further arranged to control the host interface logic to write a frame header to the allocated space in the host memory, indicating to the host processor a total length of the data frame.

Preferably, the receive logic, protocol processor and host interface logic are contained together in a single integrated circuit chip, which is separate from the host processor and host memory.

There is also provided, in accordance with a preferred embodiment of the present invention, a method for interfacing a host processor to a network, including:

receiving a sequence of data packets from the network at a network adapter, each packet including respective header data;

processing the header data in the adapter so as to identify a group of the received packets that contain respective fragments of a data frame, the fragments having a fragment order within the data frame;

allocating space for the data frame in a host memory accessible by the host processor;

writing the fragments of the data frame from the network adapter to the space allocated in the host memory so that the fragments are reassembled in the space in the fragment order; and notifying the host processor when all of the fragments have been reassembled.

The present invention will be more fully understood from the following detailed description of the preferred embodiments thereof, taken together with the drawings in which:

DETAILED DESCRIPTION OF PREFERRED EMBODIMENTS

Figure 1:
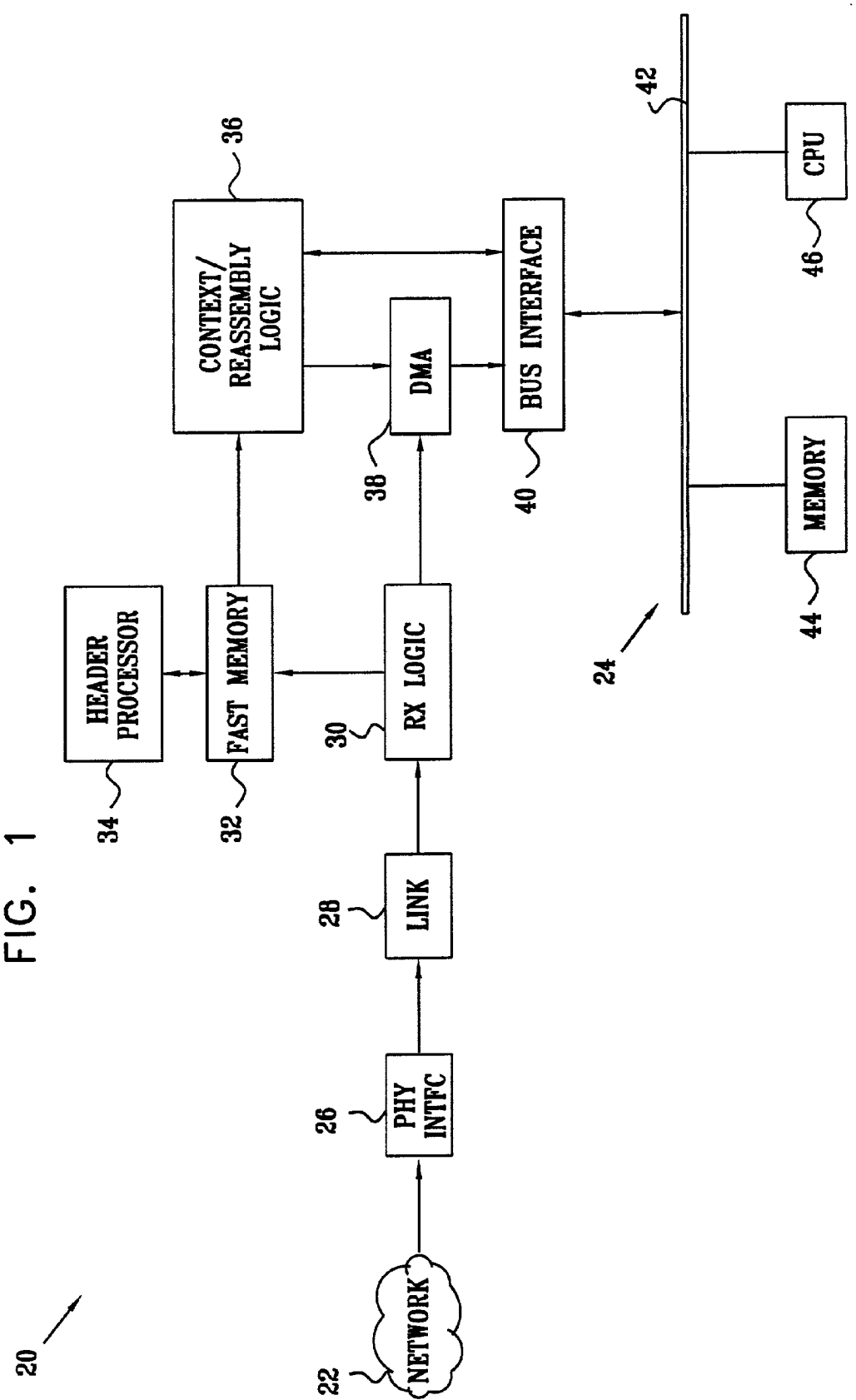
FIG. 1 is a block diagram that schematically illustrates elements of a network interface adapter, in accordance with a preferred embodiment of the present invention.

FIG. 1 is a block diagram that schematically illustrates elements of a network interface adapter 20, in accordance with a preferred embodiment of the present invention. The figure shows only a receive path of the adapter, since the transmit path is not directly material to the present invention. Further details of the construction and operation of adapter 20, including both transmit and receive paths, are provided in the above-mentioned companion application entitled "Network Adapter with Embedded Deep Packet Processing." As described in that application, the elements of adapter 20, as shown in FIG. 1 and described hereinbelow, are preferably contained in a single integrated circuit chip, most preferably an application-specific integrated circuit (ASIC) chip.

Adapter 20 links a packet network 22 to a host 24, such as a processor node, input/output (I/O) node or gateway. In the present embodiment, network 22 is an IP network, and the packets arriving at adapter 20 comprise, inter alia, TCP/IP and/or UDP/IP packets. Alternatively or additionally, adapter 20 may be programmed to handle other network- and transport-layer protocols, as are known in the art. The adapter receives incoming data packets from network 22 at a physical layer (PHY) interface 26. A link-layer processor 28 performs data link layer processing, as is likewise known in the art, and passes the incoming packets to receive logic 30. The receive logic preferably separates out a portion of each packet that is known to contain the packet header, and passes the header portion to a fast memory 32. This memory is referred to as "fast" because it is coupled to an embedded processor 34 so that the processor can read from and write to the fast memory in no more than one or two clock cycles.

Processor 34 reads and processes the network- and transport-layer headers of the incoming packets from fast memory 32. The header processing functions of processor 34 are further described in the above-mentioned companion application. When the processor encounters a TCP/IP or UDP/IP header, it also undertakes the frame reassembly functions described hereinbelow. These functions are preferably controlled by firmware microcode instructions and tables that are loaded into adapter 20 and are read by processor 34 as needed. The functions of processor 34 can thus be modified simply by changing the microcode. If the processor encounters header protocols that it is not programmed to handle, it simply passes the headers through to host 24 for software processing.

For each incoming packet, processor 34 writes an output header and command to memory 32 based on the information contained in the packet header. Context and reassembly logic 36 uses the commands to allocate space for the packet data in a host memory 44 of host 24. Logic 36 also generates descriptors instructing a direct memory access (DMA) engine 38 to write the output header to the host memory, along with the appropriate packet data from receive logic 30. Context and reassembly logic 36 and DMA engine 38 communicate with host memory 44 through a bus interface 40, which links adapter 20 to a host bus 42. Typically, bus 42 comprises a parallel bus, such as a Peripheral Component Interface (PCI), as is known in the art. After the DMA engine has finished writing a desired quantum of data to memory 44, logic 36 raises an interrupt to a CPU 46 in host 24, notifying the CPU that it can read the data from the memory. In the case of TCP and UDP frame data, the quanta in question are complete frames, typically comprising multiple fragments that were contained in multiple packets.

Figure 2:
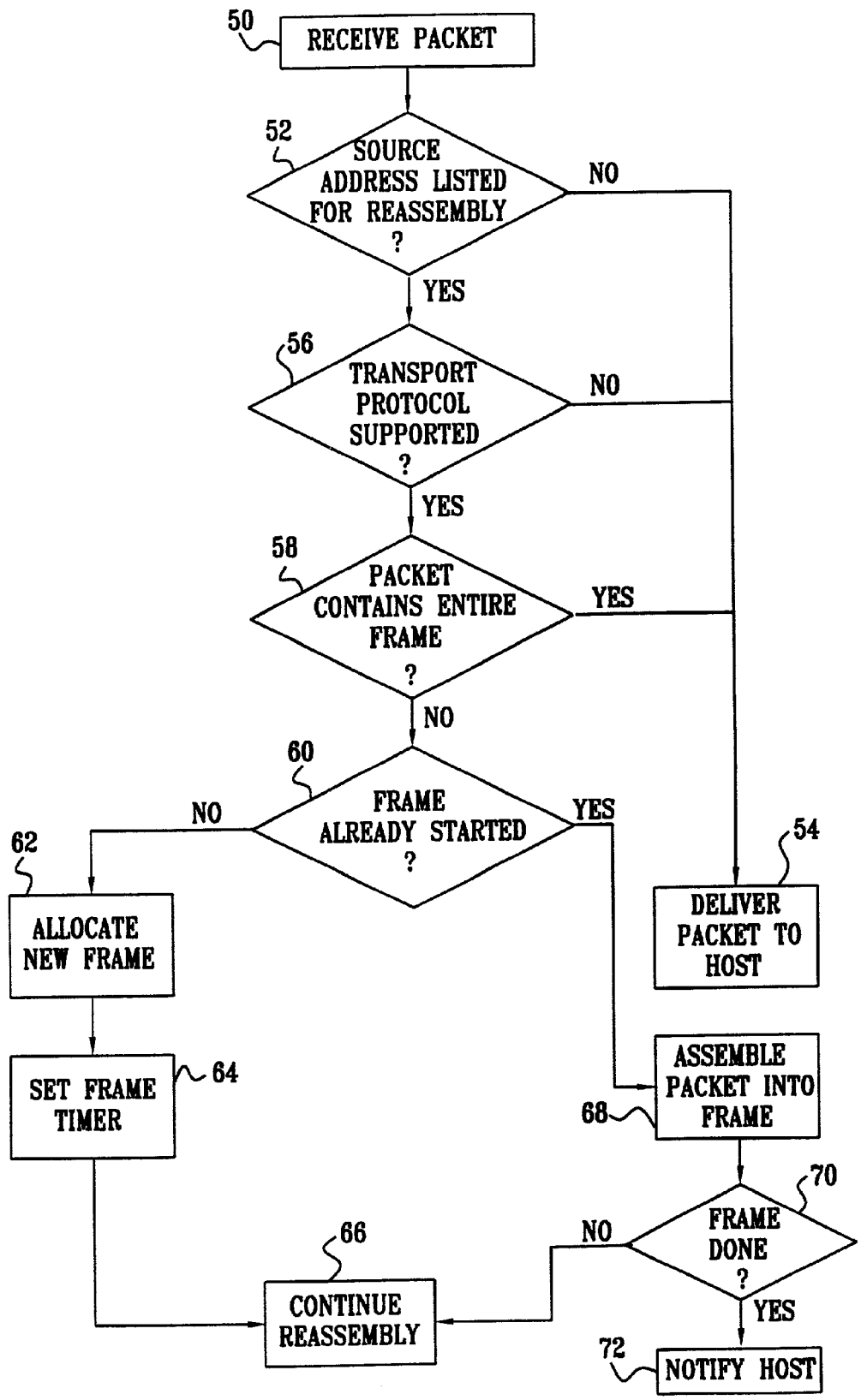
FIG. 2 is a flow chart that schematically illustrates a method for data frame reassembly, in accordance with a preferred embodiment of the present invention.

FIG. 2 is a flow chart that schematically illustrates a method by which adapter 20 processes TCP/IP and UDP/IP packets from network 22 and reassembles TCP and UDP frames in host memory 44, in accordance with a preferred embodiment of the present invention. The method is initiated by embedded processor 34 whenever it receives a new packet header, at a packet reception step 50.

Processor 34 first examines the IP source address of the packet, which is listed in the source address field of the IP header, at a source address checking step 52. Preferably, the processor maintains a source address table in memory 32 indicating specific IP addresses and/or subnets for which reassembly is supported by adapter 20. Typically, addresses and subnets are included in this table when it is known that the network connections from these addresses or subnets to adapter 20 are sufficiently fast and reliable so that there is a high likelihood that all of the fragments of a given frame will reach the adapter within a reasonable time span. When the source IP address of the packet is not included in the table, processor 34 completes any other header processing functions that it is programmed to carry out, but it does not attempt to reassemble the packet into a TCP or UDP data frame. Instead, the packet is simply delivered without reassembly to host memory 44, at a packet delivery step 54. In this case, application software on CPU 46 will be responsible for frame reassembly, as well as other higher-layer protocol functions.

If the IP header indicates that the packet is a candidate for frame reassembly, processor 34 checks the transport-layer protocol header, at a protocol checking step 56. If the protocol is TCP or UDP (or another frame-oriented protocol that processor 34 is programmed to support), the packet is passed on for frame reassembly. Otherwise, the packet is delivered to host memory 44 at step 54, as described above.

For TCP/IP and UDP/IP packets, processor 34 next determines whether the packet contains an entire TCP or UDP frame, or whether it contains only a fragment of the frame, at a fragmentation checking step 58. If the IP header has its more-fragments (MF) flag reset, and its offset field set to zero, the packet contains the entire frame. In this case, no reassembly is needed, and the frame is delivered to memory 44 at step 54. Otherwise, processor 34 concludes that the packet contains a fragment of a frame, and attempts to reassemble the fragment into its frame in memory 44, according to the steps that follow.

Preferably, processor 34 maintains a reassembly table in memory 32, listing all of the frames that are currently in the process of reassembly. The table also holds other frame data, such as the frame length and the total number of bytes received in the frame. (The frame length is determined based on information in the packet headers, as described hereinbelow with reference to FIG. 4. Typically, not all of the fragments of a given frame contain the frame length information, and it therefore may not be possible to determine the actual frame length until several or all of the fragments have been received.) At a frame searching step 60, the processor searches the table to determine whether there is already a partially-reassembled frame to which the current packet belongs. Preferably, the search uses a double hashing approach, with a search key formed by combining the ID and source address from the IP header of the packet.

If processor 34 does not find an entry in the reassembly table for the current packet, it means that the packet is the first to arrive in a new frame. The processor proceeds to assign an entry for the new frame in the reassembly table and to reserve space in host memory 44 for the frame, at a new frame allocation step 62. Details of this step are described hereinbelow with reference to FIG. 3. In addition, whenever a new frame is opened, processor 34 sets a frame timer for the frame, at a timer setting step 64. The processor then goes on to receive and reassemble the remaining fragments of the new frame, at a reassembly step 66, at which it returns to step 50 to process the next packet.

The timer values set in step 64 are preferably maintained in the reassembly table. The processor checks the values periodically in order to determine whether any of the pending frames have timed out, i.e., whether the time that has passed since adapter 20 received the first fragment of the frame has exceeded a preset limit without reassembly having been completed. When a timeout occurs for a given frame, processor 34 instructs logic 36 to free the buffer space that has been reserved for the frame in memory 44. Any fragments already in the memory are discarded. If the frame was a TCP frame (requiring reliable transmission), processor 34 sends a NACK message to the source address of the frame, indicating that the frame was lost. Preferably, the message is sent by a transmit path of adapter 20 (not shown), without involvement of host CPU 46.

If at step 60, processor 34 finds an entry in the reassembly table corresponding to the current packet, it concludes that the packet contains a fragment of a frame whose reassembly is in progress. In this case, the processor determines the location of the fragment in the order of its particular frame, and writes the fragment to the appropriate address in host memory 44, at an assembly step 68. This step is described in detail hereinbelow with reference to FIG. 5. The processor then updates the total number of bytes received in the frame and compares this value to the frame length indicated in the reassembly table, at a frame completion step 70. If the number of bytes received is less than the frame length, or if the frame length is still unknown, the processor concludes that there are further fragments still to be received in this frame, and reassembly of the frame continues at step 66.

If the number of bytes received is equal to the frame length, however, processor 34 concludes that the entire frame has been received. In this case, the processor directs logic 36 to notify host CPU 46 that the frame is waiting to be read in memory 44, at a notification step 72, indicating to the CPU the starting address and size of the frame. Before notifying the CPU, however, processor 34 preferably recomputes the total length and checksum fields of the IP header, so that they reflect the total length of the frame and the correct checksum for the modified header. DMA engine 38 writes these fields to their appropriate positions in the IP frame header at the beginning of the reassembled frame in host memory 44. After completing the processing of the frame, processor 34 resets the corresponding entry in the reassembly table.

Figure 3:
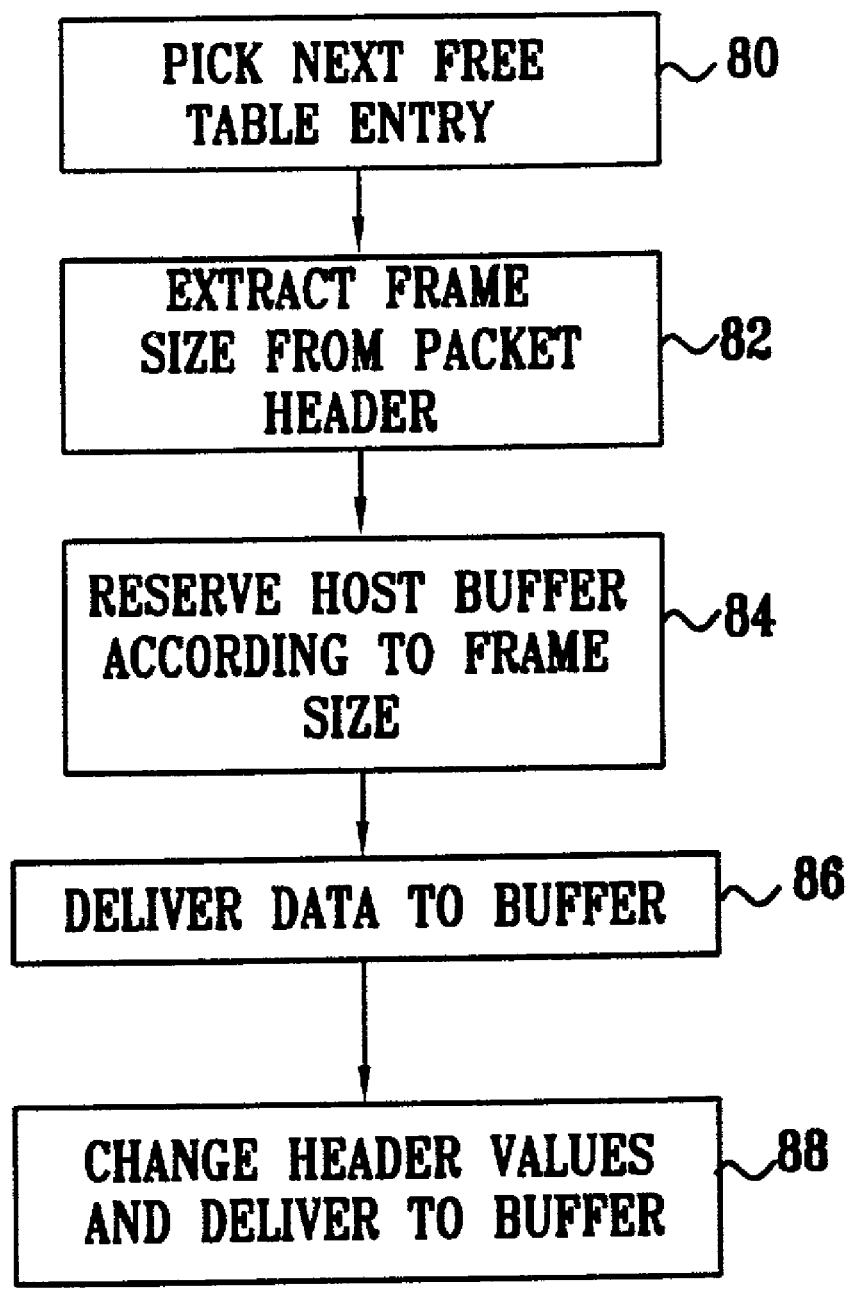
FIG. 3 is a flow chart that schematically illustrates a method for allocating space in a host memory for reassembly of a data frame, in accordance with a preferred embodiment of the present invention.

FIG. 3 is a flow chart that schematically shows details of new frame allocation step 62, in accordance with a preferred embodiment of the present invention. When processor 34 detects the first fragment in a new frame, it allocates the next free entry in the reassembly table for the frame, at an entry allocation step 80. The packet header provides the source address and ID fields needed to create the hash entry. The processor then attempts to determine the size of the frame, at a size determination step 82. For this purpose, any applicable size information is extracted from the packet header of the first fragment, as described hereinbelow with reference to FIG. 4. If the actual size cannot be determined from the first fragment, the processor sets an upper limit on the possible size of the frame.

Based on the actual or limiting size of the frame, processor 34 directs logic 36 to reserve space in host memory 44 to which the fragments of the frame will be written, at a reservation step 84. The processor then commands DMA engine 38 to write the fragment contained in the current packet from receive logic 30 to memory 44, at a data delivery step 86. The amount of data to be written is determined by the total length field in the IP header of the packet, less the header length field. The starting address for writing the fragment data is given by the base address of the reserved space, plus the sum of the fragment offset and header length fields.

The processor also commands the DMA engine to write the IP header (including the IP options) to the host memory, at a header delivery step 88. This information is written to the head of the reserved space, beginning at the base address. (The TCP or UDP header contents are also written to the reserved space, preferably as a part of the frame payload data.) Before writing the information, however, processor 34 resets the MF flag to its "last fragment" value and resets the fragment offset to zero, so that when CPU 46 reads the frame, it will view the entire frame as an unfragmented entity. The total length and checksum fields of the frame header are updated subsequently, when reassembly of the frame is completed, as described above with reference to step 72.

Figure 4:
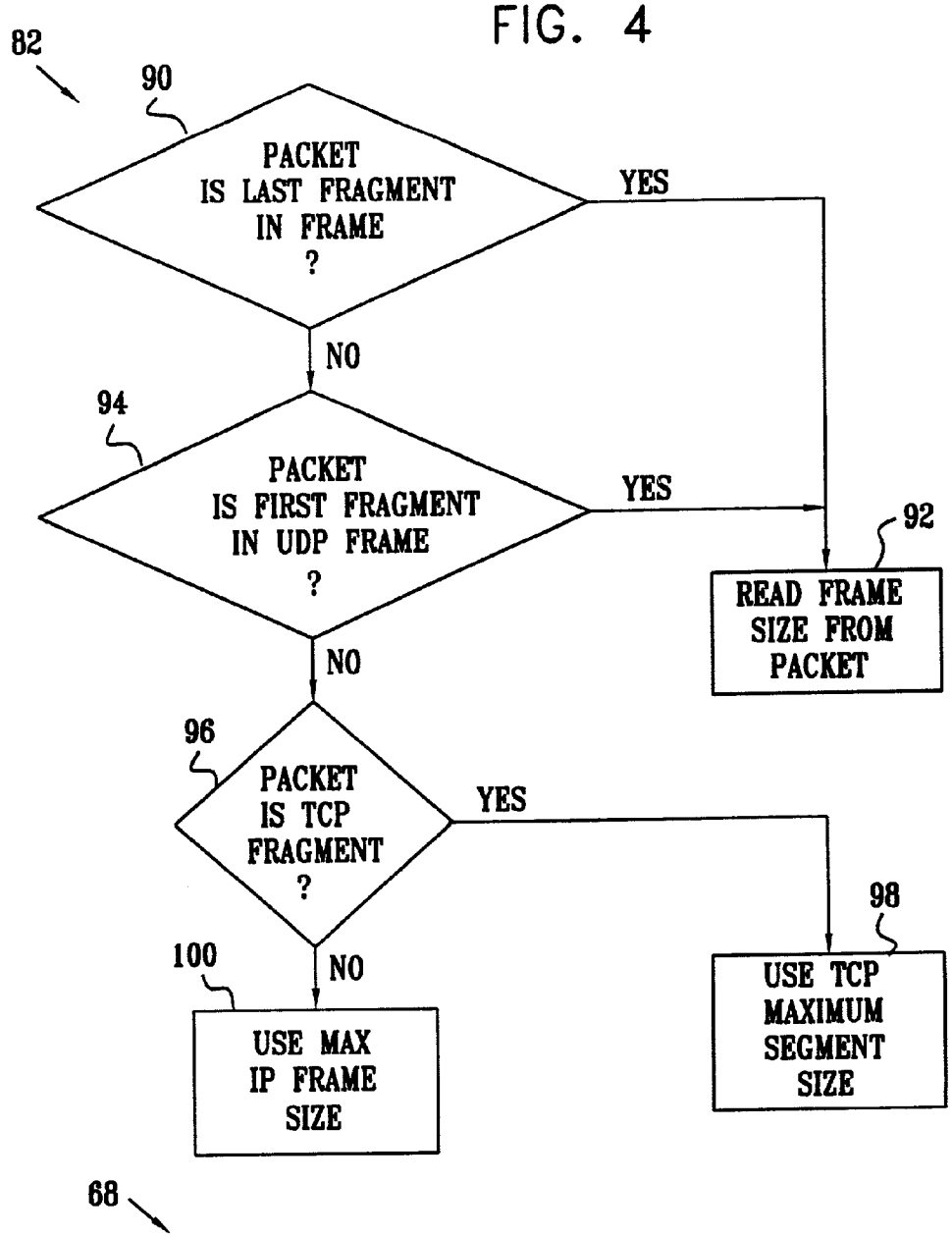
FIG. 4 is a flow chart that schematically illustrates a method for determining a buffer size to allocate for a data frame, in accordance with a preferred embodiment of the present invention.

FIG. 4 is a flow chart that schematically shows details of size determination step 82, in accordance with a preferred embodiment of the present invention. The purpose of this step is to determine the actual size of the frame, based on the first fragment of the frame to arrive at adapter 20, or if the actual size cannot be determined, to set an upper limit on the possible frame size. It is important to keep the upper limit as low as possible, in order to avoid wasting space in host memory 44 when reserving buffer space for reassembly of the frame.

When the first packet in a new frame arrives, processor 34 checks the MF flag to determine whether it contains the last fragment in the frame, at a last fragment determination step 90. If the flag is reset, marking the fragment as the last in the frame, it is possible for the processor to determine the frame size directly from the IP header of the packet, at a frame size reading step 92. The frame size in this case is given simply by the sum of the fragment offset and total length fields in the IP header, regardless of whether the frame is a TCP or a UDP frame.

If the first packet to arrive does not contain the last fragment (as will usually be the case), it is still possible to determine the frame size exactly if the packet is found to contain the first fragment of a UDP frame, at a first fragment determination step 94. In this case, the frame length is given by the length field in the UDP header. This information is read out at step 92.

TCP provides a maximum segment size (MSS), which can be specified among the options provided in the TCP header. The MSS is sent only in the initial connection request, in order to communicate the maximum receive segment size at the TCP entity sending the segment. At a TCP fragment determination step 96, processor 34 determines whether the packet contains a fragment of a TCP frame, and whether the MSS field is present. If so, the size of the buffer to be reserved in host memory 44 is set the value of the MSS field, at a MSS implementation step 98.

If none of these indications are found of the actual or maximal buffer size needed for the current frame, the buffer size to be reserved is set to a maximum frame size permitted by network 22, at a maximum utilization step 100. Typically, this maximum size is set to the maximum transmission unit (MTU) permitted by the IP standard, which is 64 KB.

Figure 5:
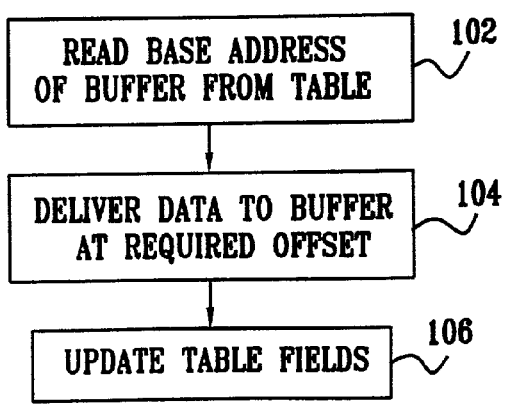
FIG. 5 is a flow chart that schematically illustrates a method for assembling a data fragment into a frame, in accordance with a preferred embodiment of the present invention.

FIG. 5 is a flow chart that schematically shows details of assembly step 68, in accordance with a preferred embodiment of the present invention. This method is invoked every time a packet is received that is found to contained a fragment of a frame that has already begun reassembly and has an entry open in the reassembly table. After identifying the frame to which the fragment belongs at step 60, processor 34 refers to the reassembly table in order to read the base address of the buffer that is reserved for the frame in host memory 44, at a base address reading step 102. Only the data payload of the fragment is written to memory 44, at a data delivery step 104, while the header is discarded. The length of the data to be written is given by the total length field in the packet header, less the header size. The starting address for writing the data to the buffer is given by the sum of the base address plus the fragment offset and header size fields of the packet.

After writing the data to memory 44, processor 34 updates the fields of the reassembly table, at a table update step 106. The number of received bytes in the frame is incremented in the table according to the fragment size. If the MF flag of the packet just processed was reset, indicating that it contained the last fragment of the frame (in the data order of the frame itself, not necessarily the order of arrival of the packets at adapter 20), processor 34 can determine the frame size by taking the sum of the fragment offset and total length fields in the IP header of the packet. The frame size thus determined is also entered in the reassembly table at step 106. The frame size is used at step 70, as described above, in determining when the entire frame has been received.

Although preferred embodiments are described hereinabove with reference to certain specific protocols, the principles of the present invention may be applied in a straightforward way to deal with other communication protocols. Similarly, although FIG. 1 illustrates a certain architecture of adapter 20 that is useful in implementing the methods of the present invention, other implementations will be apparent to those skilled in the art. It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A network interface device, comprising:
   receive logic, which is coupled to receive from a network a sequence of data packets, each packet comprising respective header data;
   a protocol processor, coupled to read and process the header data so as to identify a group of the received packets that contain respective fragments of a data frame, the fragments having a fragment order within the data frame; and
   host interface logic, which is coupled to a host memory accessible by a host processor, and is controlled by the protocol processor so that irrespective of whether the sequence in which the packets are received coincides with the fragment order, the host interface logic allocates space for the data frame in the host memory responsively to the header data of the packet received first in the sequence among the packets in the group, and reassembles the fragments of the data frame in the fragment order in the space allocated in the host memory before processing of the reassembled data frame by the host processor.

2. A device according to claim 1, wherein the protocol processor is arranged to control the host interface logic so as to write each of the fragments to a respective location within the allocated space in the host memory responsive to a fragment offset parameter in the header data of each of the packets.

3. A device according to claim 1, wherein the protocol processor is arranged to control the host interface logic so as to allocate the space for the data frame responsive to the packet that is received first in the sequence among the packets in the group.

4. A device according to claim 3, wherein the protocol processor is arranged to determine a size of the space to allocate responsive to a frame length indication in the header data of the packet received first in the sequence.

5. A device according to claim 4, wherein the frame length indication comprises one or more fields in the header data indicating an exact length of the data frame.

6. A device according to claim 4, wherein the frame length indication comprises one or more fields in the header data indicating an upper bound on a length of the data frame.

7. A device according to claim 1, wherein the protocol processor is arranged to monitor a time required to receive all of the packets in the group, and to control the host interface logic so as to release the space allocated for the data frame if the time exceeds a predetermined limit without all of the fragments in the data frame having been reassembled.

8. A device according to claim 7, wherein when the time exceeds the predetermined limit without all of the fragments in the data frame having been reassembled, the protocol processor is arranged to return a message over the network to a source of the packets indicating that the data frame was not received.

9. A device according to claim 1, wherein the group of the received packets is one of a plurality of different groups, the packets in the different groups containing the fragments of different, respective data frames, and wherein the protocol processor is arranged to identify the different groups and to control the host interface logic so as to simultaneously reassemble the fragments of the different data frames in respectively-allocated spaces in the host memory.

10. A device according to claim 1, wherein the packets are transmitted over the network and received by the receive logic in accordance with one or more communication protocols, whereby the header data in the packets comprise protocol information, and wherein the protocol processor is arranged to identify the group and to control the host interface logic responsive to the protocol information.

11. A device according to claim 10, wherein the one or more communication protocols comprise a plurality of different communication protocols, and wherein the protocol processor is arranged to select the group of packets for reassembly depending on which of the communication protocols was used in transmitting the packets.

12. A device according to claim 10, wherein the one or more protocols comprise a network layer protocol.

13. A device according to claim 12, wherein the network layer protocol comprises an Internet Protocol (IP).

14. A device according to claim 10, wherein the one or more protocols comprise a transport layer protocol.

15. A device according to claim 14, wherein the transport layer protocol comprises a Transport Control Protocol (TCP).

16. A device according to claim 14, wherein the transport layer protocol comprises a User Datagram Protocol (UDP).

17. A device according to claim 1, wherein the receive logic is coupled to receive the packets over the network from a plurality of different sources, and wherein the protocol processor is arranged to select the group of packets for reassembly dependent on the packets having been received from one or more chosen sources among the plurality of different sources.

18. A device according to claim 17, wherein the selected sources are chosen responsive to a level of reliability of a connection over the network between the chosen sources and the network interface device.

19. A device according to claim 1, wherein the protocol processor is arranged to control the host interface logic so as to write the data packets that do not belong to the identified group to the host memory substantially without reassembly processing thereof by the network interface device.

20. A device according to claim 1, wherein the host interface logic comprises a direct memory access (DMA) engine, which is arranged to write the fragments to the host memory substantially without involvement of the host processor.

21. A device according to claim 20, wherein the host interface logic is coupled to notify the host processor that the fragments of the data frame have been reassembled in the host memory only after all of the fragments have been reassembled.

22. A device according to claim 21, wherein the protocol processor is arranged to determine a total length of the data frame responsive to the header data of at least one of the packets in the group, and to count a quantity of the data in the fragments reassembled in the data frame, and to determine that all of the fragments have been reassembled by comparing the total length to the quantity of the data reassembled.

23. A device according to claim 21, wherein the protocol processor is further arranged to control the host interface logic to write a frame header to the allocated space in the host memory, indicating to the host processor a total length of the data frame.

24. A device according to claim 1, wherein the receive logic, protocol processor and host interface logic are contained together in a single integrated circuit chip, which is separate from the host processor and host memory.

25. A method for interfacing a host processor to a network, comprising:
receiving a sequence of data packets from the network at a network adapter, each packet comprising respective header data;
processing the header data in the adapter so as to identify a group of the received packets that contain respective fragments of a data frame, the fragments having a fragment order within the data frame;
allocating space for the data frame in a host memory accessible by the host processor, responsively to the header data of the packet received first in the sequence among the packets in the group, regardless of whether the packet received first in the sequence is first in the fragment order;
writing the fragments of the data frame from the network adapter to the space allocated in the host memory so that the fragments are reassembled in the space in the fragment order before processing of the reassembled data frame by the host processor irrespective of whether the sequence in which the packets are received coincides with the fragment order; and notifying the host processor when all of the fragments have been reassembled.

26. A method according to claim 25, wherein writing the fragments comprises writing each of the fragments to a respective location within the allocated space in the host memory responsive to a fragment offset parameter in the header data of each of the packets.

27. A method according to claim 25, wherein allocating the space comprises allocating the space for the data frame responsive to the packet that is received first in the sequence among the packets in the group.

28. A method according to claim 27, wherein allocating the space comprises determining a size of the space to allocate responsive to a frame length indication in the header data of the packet received first in the sequence.

29. A method according to claim 28, wherein the frame length indication comprises one or more fields in the header data indicating an exact length of the data frame.

30. A method according to claim 28, wherein the frame length indication comprises one or more fields in the header data indicating an upper bound on a length of the data frame.

31. A method according to claim 25, and comprising monitoring a time required to receive all of the packets in the group, and releasing the space allocated for the data frame if the time exceeds a predetermined limit without all of the fragments in the data frame having been reassembled.

32. A method according to claim 31, and comprising, when the time exceeds the predetermined limit without all of the fragments in the data frame having been reassembled, returning a message over the network to a source of the packets indicating that the data frame was not received.

33. A method according to claim 25, wherein the group of the received packets is one of a plurality of different groups, the packets in the different groups containing the fragments of different, respective data frames, and wherein processing the header data comprises identifying the different groups so as to simultaneously reassemble the fragments of the different data frames in respectively-allocated spaces in the host memory.

34. A method according to claim 25, wherein the packets are transmitted over the network and received by the receive logic in accordance with one or more communication protocols, whereby the header data in the packets comprise protocol information, and wherein processing the header data comprises identifying the group and preparing the fragments for writing responsive to the protocol information.

35. A method according to claim 34, wherein the one or more communication protocols comprise a plurality of different communication protocols, and wherein identifying the group comprises selecting the group of packets for reassembly depending on which of the communication protocols was used in transmitting the packets.

36. A method according to claim 34, wherein the one or more protocols comprise a network layer protocol.

37. A method according to claim 36, wherein the network layer protocol comprises an Internet Protocol (IP).

38. A method according to claim 34, wherein the one or more protocols comprise a transport layer protocol.

39. A method according to claim 38, wherein the transport layer protocol comprises a Transport Control Protocol (TCP).

40. A method according to claim 38, wherein the transport layer protocol comprises a User Datagram Protocol (UDP).

41. A method according to claim 25, wherein receiving the sequence of data packets comprises receiving the packets over the network from a plurality of different sources, and wherein processing the header data comprises selecting the group of packets for reassembly dependent on the packets having been received from one or more chosen sources among the plurality of different sources.

42. A method according to claim 41, wherein selecting the group of packets comprises choosing the one or more sources responsive to a level of reliability of a connection over the network between the chose sources and the network interface method.

43. A method according to claim 25, and comprising writing the data packets that do not belong to the identified group to the host memory substantially without reassembly processing thereof by the network adapter.

44. A method according to claim 25, wherein writing the fragments comprises writing the fragments by direct memory access (DMA), substantially without involvement of the host processor.

45. A method according to claim 25, wherein processing the header data comprises determining a total length of the data frame responsive to the header data of at least one of the packets in the group, and wherein writing the fragments comprises counting a quantity of the data in the fragments reassembled in the data frame, and comprising determining that all of the fragments have been reassembled by comparing the total length to the quantity of the data reassembled.

46. A method according to claim 25, wherein processing the header data comprises determining a total length of the data frame responsive to the header data of at least one of the packets in the group, and comprising writing a frame header to the allocated space in the host memory, indicating to the host processor a total length of the data frame.

* * * * *